United States Patent [19]
Yu

[11] Patent Number: 5,934,463
[45] Date of Patent: Aug. 10, 1999

[54] STORAGE ASSEMBLY

[76] Inventor: Jackson Yu, 2F, No. 19, Fu-Hsing-I Rd. Pei-Tou Dist., Taipei City, Taiwan

[21] Appl. No.: 09/119,295

[22] Filed: Jul. 20, 1998

[51] Int. Cl.⁶ .................................................. B65D 85/57
[52] U.S. Cl. ................................. 206/307.1; 206/387.14; 211/41.12
[58] Field of Search ............................ 206/307.1, 308.1, 206/387.14, 557, 561, 564; 211/41.12

[56] References Cited

U.S. PATENT DOCUMENTS

| | | | |
|---|---|---|---|
| 4,595,098 | 6/1986 | Kryter | 206/387.14 |
| 4,707,247 | 11/1987 | Savoy | 206/387.14 |
| 5,297,675 | 3/1994 | Martucci | 206/307.1 |
| 5,685,423 | 11/1997 | Hunt | 206/307.1 |
| 5,823,332 | 10/1998 | Clausen | 211/41.12 |

*Primary Examiner*—David T. Fidei
*Attorney, Agent, or Firm*—Ladas & Parry

[57] ABSTRACT

A storage assembly is capable of storing a plurality of record carriers having different dimensions. The storage assembly includes a main storage unit and a sub-storage unit. The sub-storage unit is adapted for receiving first record carriers. The main storage unit is adapted for receiving second record carriers of a size larger than that of the first record carriers. The sub-storage unit can be retained in the main storage unit to allow systematic placement of record carriers of different dimensions.

16 Claims, 9 Drawing Sheets

STORAGE ASSEMBLY

BACKGROUND OF THE INVENTION

1. Field of the Invention

The invention relates to a storage assembly, more particularly to a storage assembly that includes a main storage unit and a sub-storage unit, and that is adapted for storing record carriers of different dimensions.

2. Description of the Related Art

With the rapid development of multi-media technology, more forms of record carriers, such as audio and video tapes, audio and video compact disks, etc., have been made available to consumers. As the different record carriers have different dimensions, the storage thereof has become a growing problem for consumers.

Conventional storage devices, such as racks or cases, are mostly designed for storing a single type of record carrier. Thus, storage devices of different sizes are needed to store different types of record carriers. The arrangement as such is not only uneconomical but also occupies a lot of space. If the storage devices are not full, the unoccupied space cannot be used for storing other articles since the storage devices have fixed partitions. The design of conventional storage devices is, therefore, neither practical nor flexible.

SUMMARY OF THE INVENTION

Therefore, the main object of the present invention is to provide a storage assembly for storing a plurality of record carriers having different dimensions.

According to the present invention, a storage assembly comprises a sub-storage unit, a main storage unit, and retaining means. The sub-storage unit confines a storage chamber that is adapted for receiving the first record carriers therein, and has an open top end for accessing the storage chamber, and a closed bottom end. The main storage unit has a rectangular first bottom wall with opposite first longitudinal edges and opposite first lateral edges that extend between the first longitudinal edges, and two first longitudinal walls that extend uprightly and respectively from the first longitudinal edges. The main storage unit confines a main storage compartment that is adapted for storing the second record carriers therein, and has an open top side for accessing the main storage compartment. The main storage unit further has two main spacer sets that extend respectively from the first longitudinal walls and into the main storage compartment, and that are adapted to position the second record carriers in the main storage compartment. Each of the main spacer sets includes a plurality of parallel main spacer plates transverse to the respective one of the first longitudinal walls and disposed spacedly along a longitudinal direction of the respective one of the first longitudinal walls. Each of the main spacer plates extends from the open top side of the main storage compartment toward the first bottom wall, and has a vertical edge distal to the respective one of the longitudinal walls. The vertical edges of the main spacer plates of the main spacer sets cooperatively define a positioning space in the main storage compartment. The positioning space has a size sufficient to receive the sub-storage unit therein such that the closed bottom end of the sub-storage unit is on top of the first bottom wall, and such that the vertical edges of the main spacer plates of the main spacer sets extend upwardly beyond the open top end of the sub-storage unit. The retaining means is provided on the main storage unit and the sub-storage unit for retaining removably the sub-storage unit in the positioning space.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
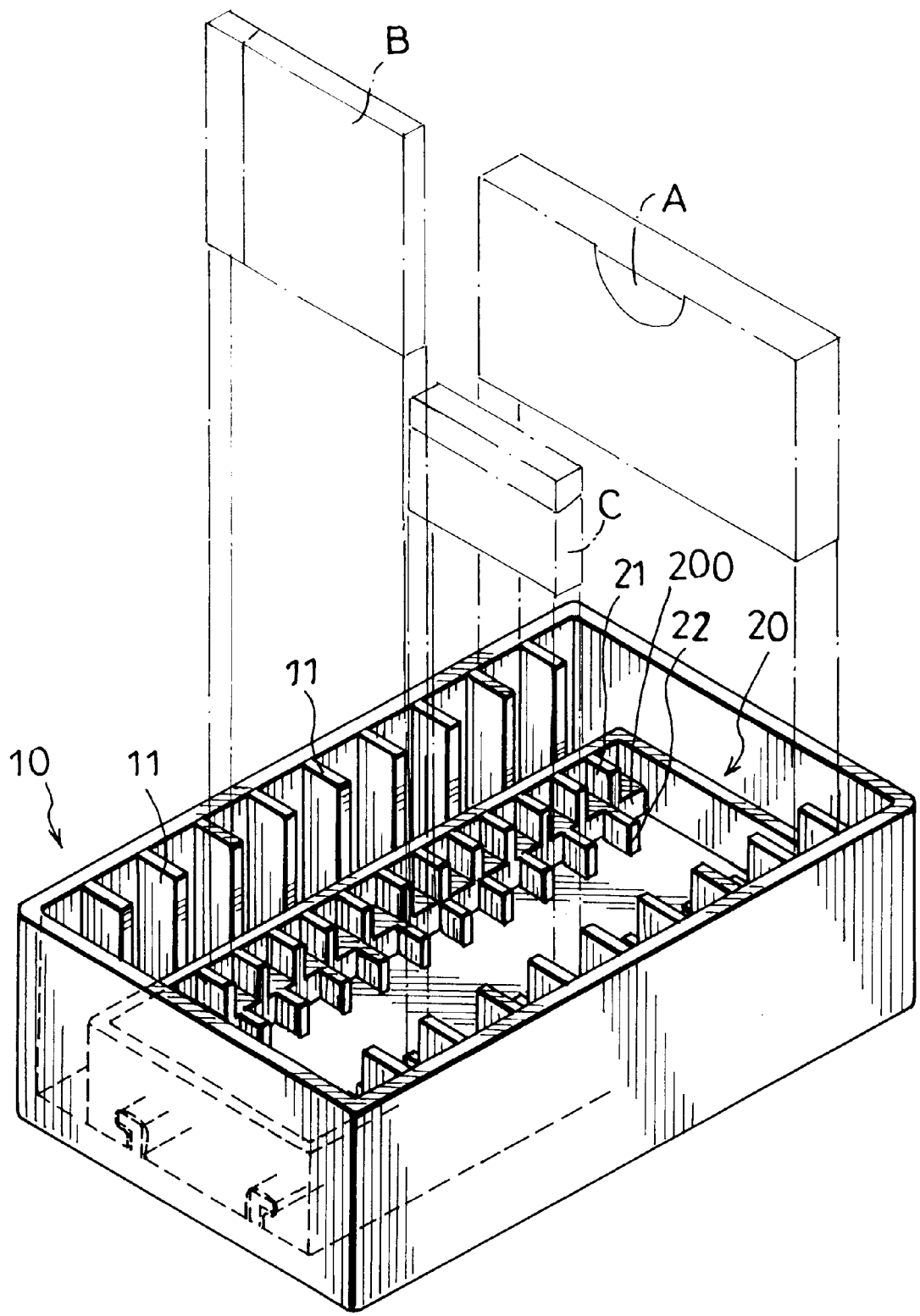
FIG. 1 is a perspective assembled view of the first preferred embodiment of a storage assembly according to the present invention.

Before the present invention is described in greater detail, it should be noted that like elements are denoted by the same reference numerals throughout the disclosure.

Figure 2:
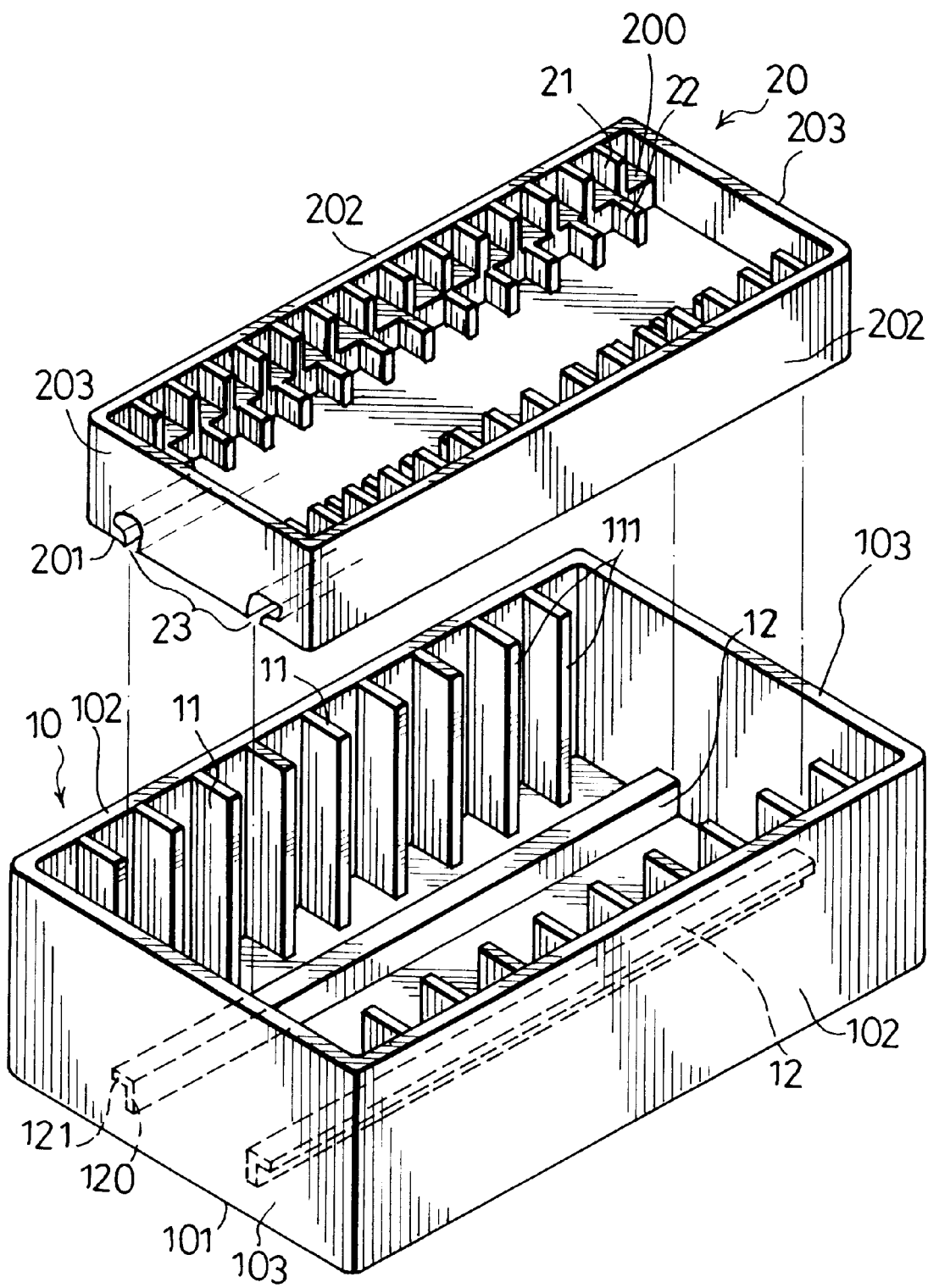
FIG. 2 is a perspective exploded view of the first preferred embodiment.
Figure 3:
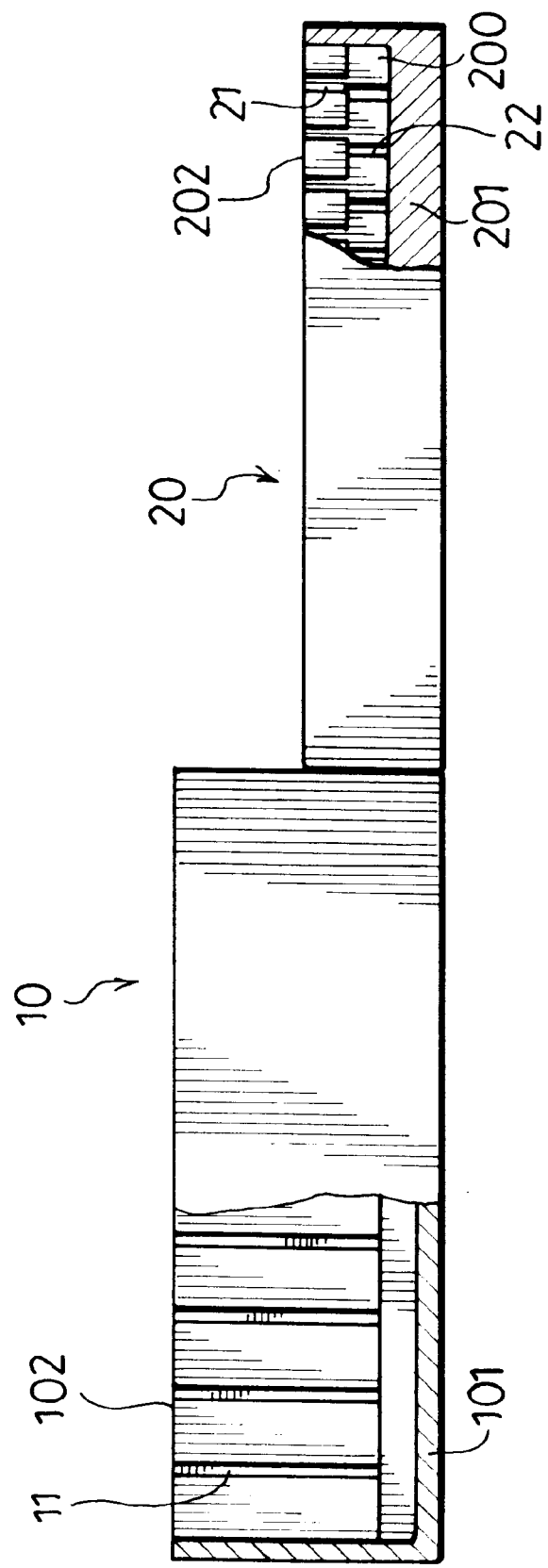
FIG. 3 is a schematic partly sectional side view of the first preferred embodiment.

Referring to FIGS. 1, 2 and 3, the first preferred embodiment of a storage assembly according to the present invention is shown to comprise a main storage unit 10 adapted for receiving first record carriers (A), a sub-storage unit 20 adapted for receiving second and/or third record carriers (B), (C), and retaining means.

The main storage unit 10 has a rectangular first bottom wall 101 with opposite first longitudinal edges and opposite first lateral edges that extend between the first longitudinal edges, and two first longitudinal walls 102 that extend uprightly and respectively from the first longitudinal edges. The main storage unit 10 confines a main storage compartment adapted for storing record carriers (A) of a comparatively large size, such as video tapes. The main storage unit 10 has an open top side for accessing the main storage compartment, and two main spacer sets that extend respectively from the first longitudinal walls 102 and into the main storage compartment to position the record carriers (A) in the main storage compartment. Each of the main spacer sets includes a plurality of parallel main spacer plates 11 that are transverse to the respective one of the first longitudinal walls 102, and that are disposed spacedly along a longitudinal direction of the respective one of the first longitudinal walls 102. Each of the main spacer plates 11 extends from the open top side of the main storage compartment toward the first bottom wall 101, nd has a vertical edge 111 distal to the respective one of the first longitudinal walls 102.

The main storage unit 10 further has two first lateral walls 103 that extend uprightly and respectively from the first lateral edges.

The sub-storage unit 20 confines a storage chamber adapted for receiving record carriers (B, C) of a size smaller than that of the record carriers (A), and has an open top end for accessing the storage chamber, and a closed bottom end. The sub-storage unit 20 has a rectangular second bottom wall 201 with opposite second longitudinal edges and opposite second lateral edges that extend between the second longitudinal edges, and two second longitudinal walls 202 that extend uprightly and respectively from the second longitudinal edges.

The sub-storage unit 20 further has two second lateral walls 203 that extend uprightly and respectively from the second lateral edges, and two sub-spacer sets that extend into the storage chamber adjacent to the second longitudinal walls 202 respectively, and that are adapted to position record carriers (B, C) in the storage chamber. Each of the sub-spacer sets includes an elongated block 200 that extends from the second bottom wall 201 along the adjacent one of the second longitudinal walls 202, and a plurality of parallel first spacer plates 22 that extend from one side of the elongated block 200 toward an opposite one of the second longitudinal walls 202. The first spacer plates 22 are adapted to position record carriers (C) of a relatively small size, such as cassette tapes, between the elongated blocks 200 of the sub-spacer sets in the storage chamber. Each of the sub-spacer sets further includes a plurality of parallel second spacer plates 21 that extend upwardly from the elongated block 200 and that are parallel to the first spacer plates 22. The second spacer plates 21 are adapted to position record carriers (B) of a medium size, such as compact disks, on top of the elongated blocks 200 of the sub-spacer sets in the storage chamber. Preferably, the second spacer plates 21 may differ in number from the first spacer plates 22.

The vertical edges 111 of the main spacer plates 11 of the main spacer sets define a positioning space in the main storage compartment. The positioning space has a size sufficient to receive the sub-storage unit 20 therein such that the closed bottom end of the sub-storage unit 20 is on top of the first bottom wall 101, and such that the vertical edges 111 of the main spacer plates 11 of the main spacer sets extend upwardly beyond the open top end of the sub-storage unit 20.

The retaining means 12 is provided on the main storage unit 10 and the sub-storage unit 20 for retaining removably the sub-storage unit 20 in the positioning space defined by the vertical edges 111 of the main spacer plates 11 of the main spacer sets. In this embodiment, the retaining means comprises a first coupling unit provided on a top side of the first bottom wall 101, and a second coupling unit provided on a bottom side of the second bottom wall 201. The first coupling unit includes a pair of inverted L-shaped resilient projections 12 extending longitudinally in the main storage compartment. Each projection 12 has an upright portion 120 extending from the top side of the first bottom wall 101, and a transverse portion 121 on a top end of the upright portion.

The transverse portions 121 of the projections 12 extend in opposite directions. The second coupling unit includes a pair of recesses 23 for engaging fittingly and removably the projections 12. In use, referring to FIG. 1, the user may arrange record carriers (A), (B) and (C) neatly in the substorage unit 20 and the main storage unit 10. Referring to FIG. 3, the sub-storage unit 20 may be removed from and placed beside the main storage unit 10 when desired.

Figure 4:
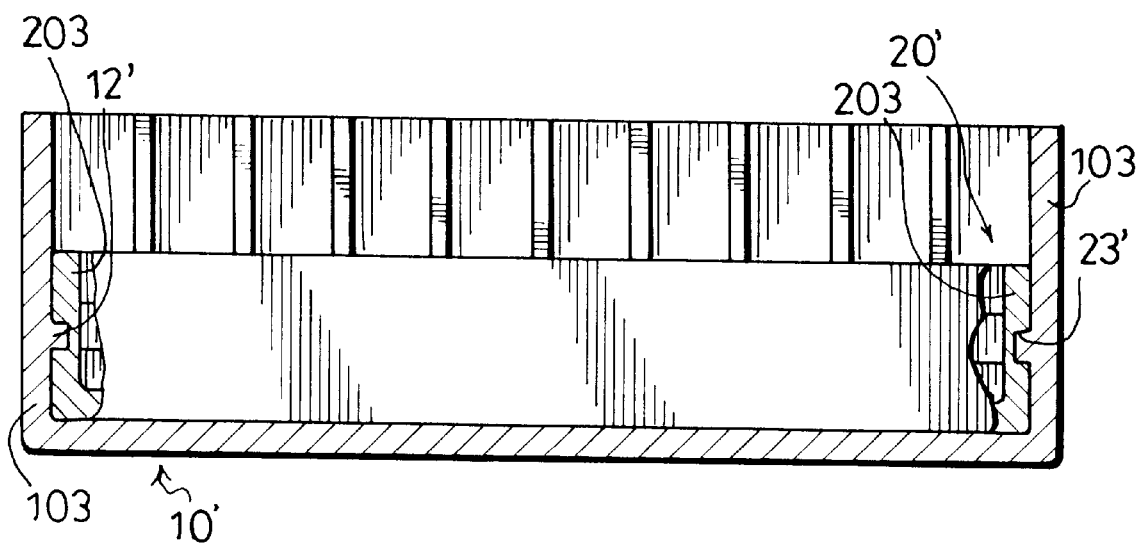
FIG. 4 is a schematic vertical sectional view of the second preferred embodiment of the storage assembly according to the present invention.

With reference to FIG. 4, which illustrates the second preferred embodiment of the storage assembly according to the present invention, the first coupling unit includes a pair of resilient projections 12' on inner sides of the first lateral walls 103 of the main storage unit 10. The second coupling unit includes a pair of recesses 23' on outer sides of the second lateral walls 203 of the sub-storage unit for engaging fittingly and removably the resilient projections 12'.

Figure 5:
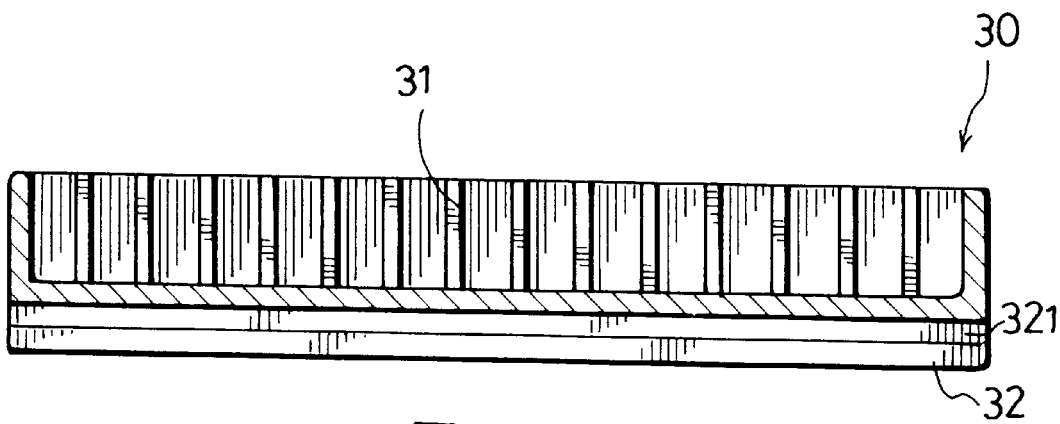
FIG. 5 is a schematic vertical sectional view of the sub-storage unit of the third preferred embodiment of the storage assembly according to the present invention.

FIG. 5 illustrates a sub-storage unit 30 of the third preferred embodiment of the storage assembly according to the present invention. The sub-storage unit 30 has two sub-spacer sets that are similar to the main spacer sets in the main storage unit 10 of the first preferred embodiment (see FIG. 1) albeit with a denser spacing. Retaining means 32 are provided on a bottom side of the bottom wall of the sub-storage unit 30. The retaining means 32 in this embodiment confine recesses 321 (only one is shown) that engage fittingly the projections 12 on the top side of the bottom wall 103 of the main storage unit 10.

Figure 6:
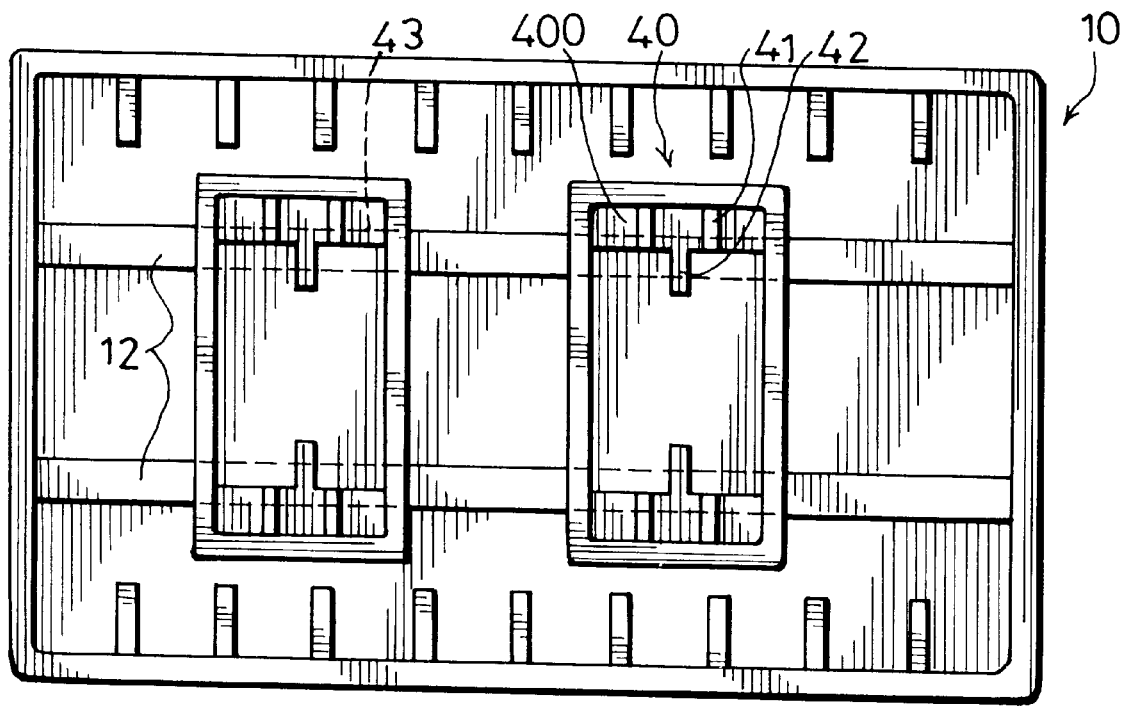
FIG. 6 is a schematic top view of the fourth preferred embodiment of the storage assembly according to the present invention.

With reference to FIG. 6, the fourth preferred embodiment of the storage assembly according to the present invention is shown to comprise a main storage unit 10 and two sub-storage units 40 of a size smaller than that of the sub-storage unit 20 in the first preferred embodiment. In this embodiment, the first longitudinal edges of the bottom wall of the main storage unit 10 are at least two times longer than the second longitudinal edges of the bottom walls of the sub-storage units 40. Each sub-storage unit 40 is provided with two sub-spacer sets similar to those of the first preferred embodiment. That is to say, each sub-spacer set of the sub-storage unit 40 includes an elongated block 400, at least one first spacer plate 42 that extends from one side of the elongated block 400, and a plurality of second spacer plates 41 that extend upwardly from the elongated block 400 and that are parallel to the first spacer plate 42. The bottom wall of each sub-storage unit 40 has recesses 43 for engaging removably the projections 12 on the bottom wall of the main storage unit 10. The positions of the sub-storage units 40 on the projections 12 are adjustable for optimum use of the available space.

Figure 7:
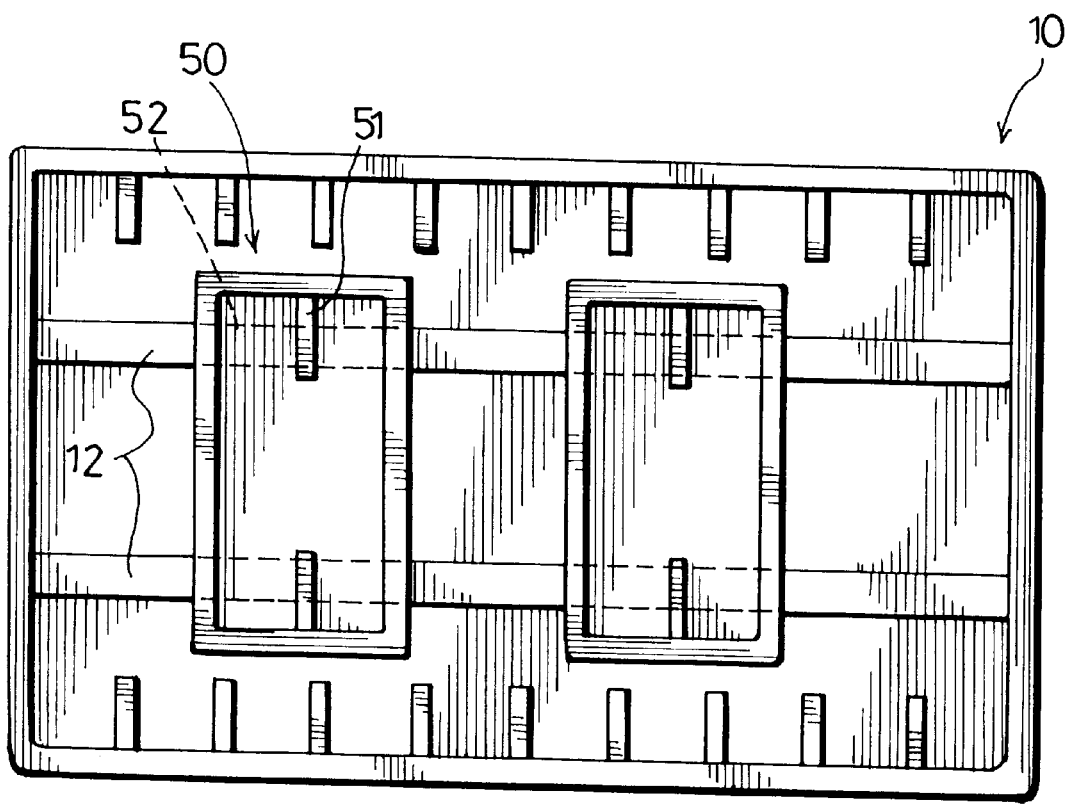
FIG. 7 is a schematic top view of the fifth preferred embodiment of the storage assembly according to the present invention.

The fifth preferred embodiment of the storage assembly according to the present invention is shown in FIG. 7 to be generally similar to the fourth preferred embodiment. However, in the present embodiment, the sub-storage units 50 are each provided with a single pair of spacer plates 51.

Figure 8:
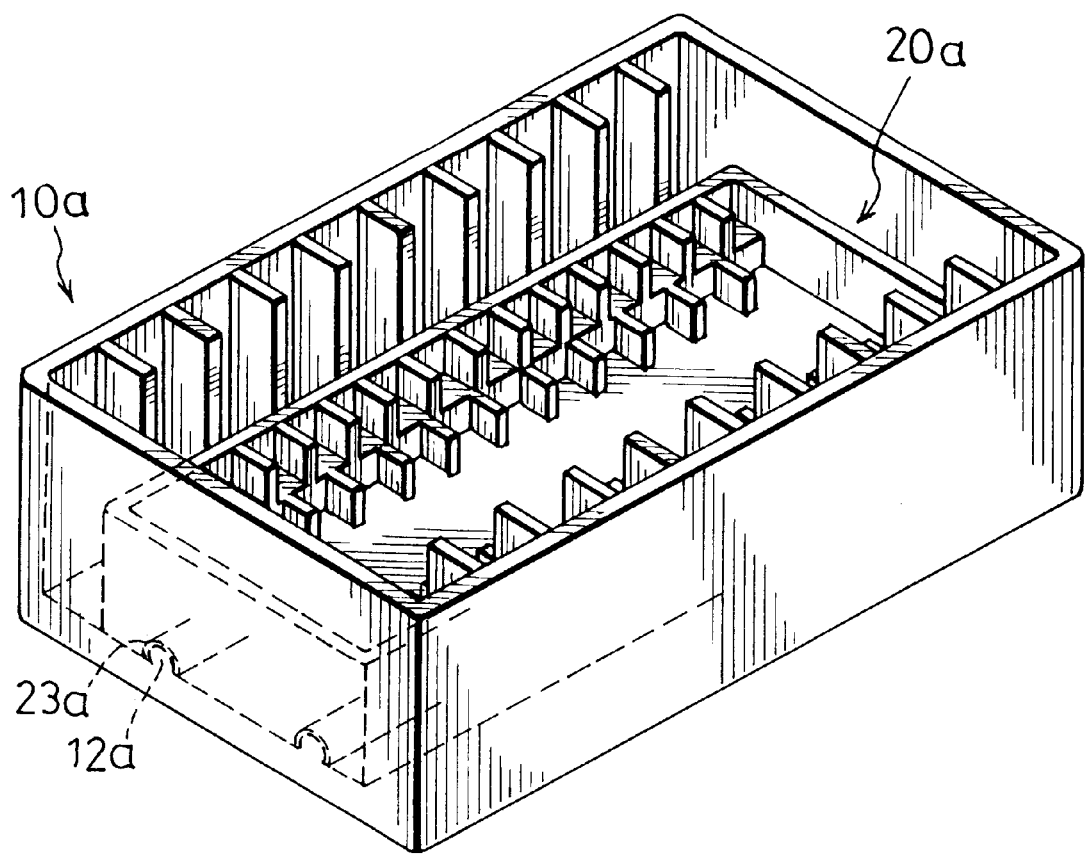
FIG. 8 is a perspective view of the sixth preferred embodiment of the storage assembly according to the present invention.

FIG. 8 shows the sixth preferred embodiment of the storage assembly according to the present invention, which is essentially similar to the first preferred embodiment shown in FIGS. 1 to 3. In the present embodiment, the first coupling unit includes two resilient projections 12a extending longitudinally in the main storage compartment of the main storage unit 10a and having rounded cross-sections. The second coupling unit includes two recesses 23a formed in the sub-storage unit 20a for engaging fittingly the projections 12a.

Figure 9:
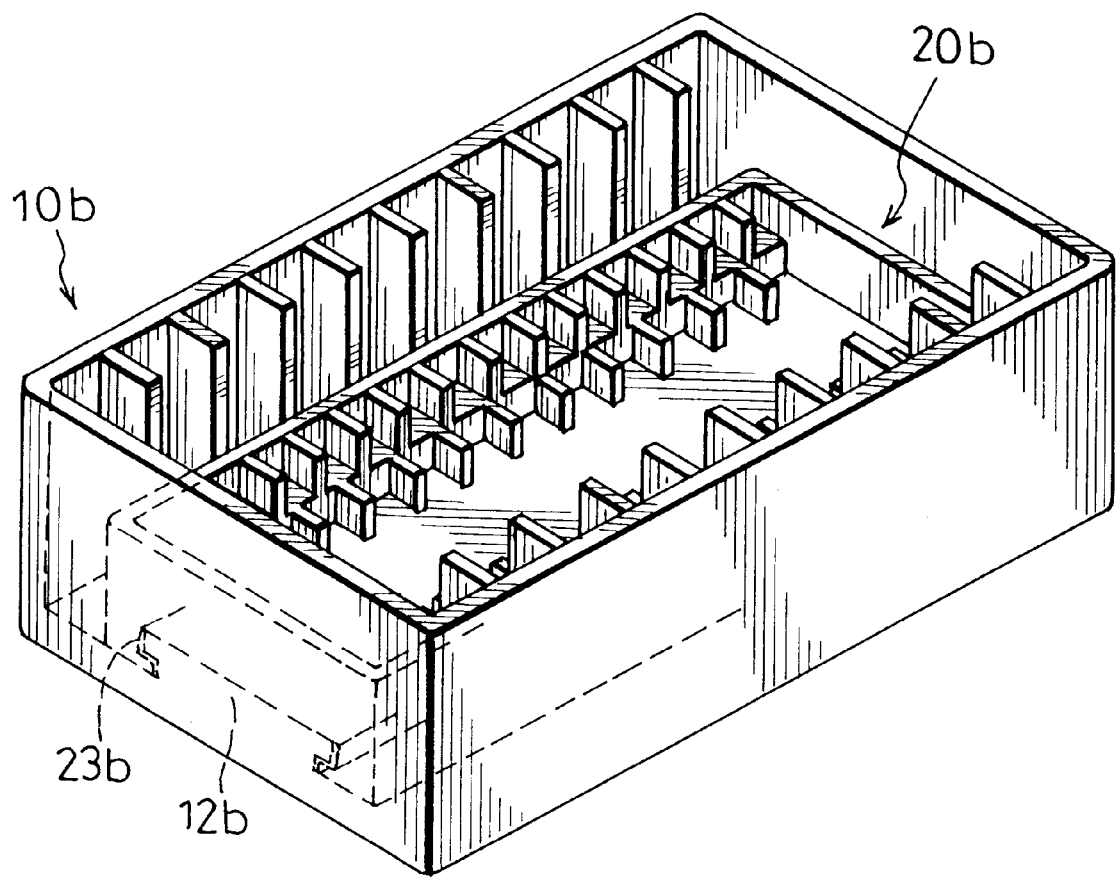
FIG. 9 is a perspective view of the seventh preferred embodiment of the storage assembly according to the present invention.

FIG. 9 shows the seventh preferred embodiment of the storage assembly according to the present invention, which is essentially similar to the first preferred embodiment. In the present embodiment, the first coupling unit includes a resilient dovetail projection 12b extending longitudinally in the main storage compartment of the main storage unit 10b. The second coupling unit includes a dovetail recess 23b formed in the sub-storage unit 20b for engaging fittingly and removably the dovetail projection 12b.

Figure 10:
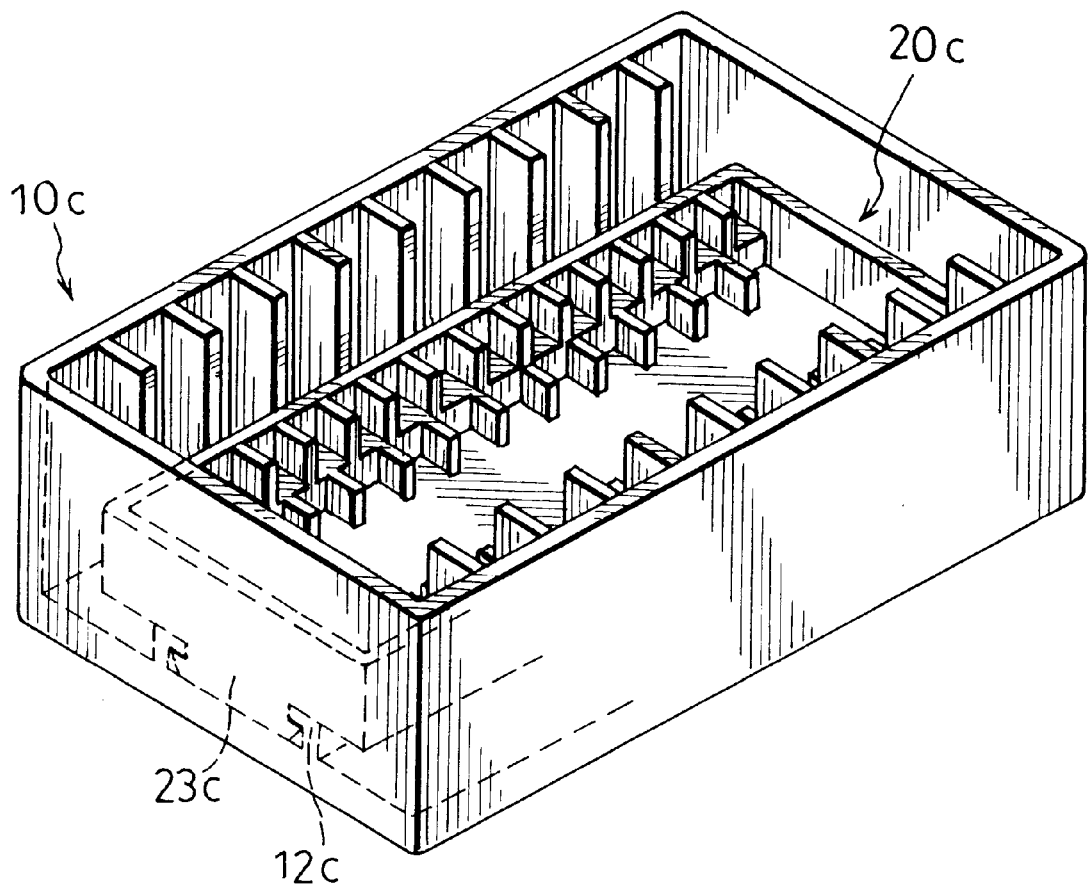
FIG. 10 is a perspective view of the eighth preferred embodiment of the storage assembly according to the present invention.

FIG. 10 shows the eighth preferred embodiment of the storage assembly according to the present invention, which is also similar to the first preferred embodiment. In the present embodiment, the second coupling unit includes a dovetail projection 23c defined by two recesses on the bottom side of the sub-storage unit 20c. The first coupling unit includes two resilient projections 12c that define a dovetail recess therebetween for engaging the dovetail projection 23c.

It can be seen from the foregoing that the storage assembly according to the present invention provides storage spaces of different sizes for storing record carriers having different dimensions. In addition, since the sub-storage units are removably disposed in the main storage unit, storage spaces can be more effectively planned and used to allow systematic organization of different record carriers.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A storage assembly for storing a plurality of at least first and second record carriers having different dimensions, said storage assembly comprising:

a sub-storage unit confining a storage chamber that is adapted for receiving the first record carriers therein, said sub-storage unit having an open top end for accessing said storage chamber, and a closed bottom end;

a main storage unit having a rectangular first bottom wall with opposite first longitudinal edges and opposite first lateral edges that extend between said first longitudinal edges, and two first longitudinal walls that extend uprightly and respectively from said first longitudinal edges, said main storage unit confining a main storage compartment that is adapted for storing the second record carriers therein, said main storage unit having an open top side for accessing said main storage compartment, and two main spacer sets that extend respectively from said first longitudinal walls and into said main storage compartment and that are adapted to position the second record carriers in said main storage compartment, each of said main spacer sets including a plurality of parallel main spacer plates transverse to the respective one of said first longitudinal walls and disposed spacedly along a longitudinal direction of the respective one of said first longitudinal walls, each of said main spacer plates extending from said open top side of said main storage compartment toward said first bottom wall, and having a vertical edge distal to the respective one of said first longitudinal walls;

said vertical edges of said main spacer plates of said main spacer sets cooperatively defining a positioning space in said main storage compartment, said positioning space having a size sufficient to receive said sub-storage unit therein such that said closed bottom end of said sub-storage unit is on top of said first bottom wall, and such that said vertical edges of said main spacer plates of said main spacer sets extend upwardly beyond said open top end of said sub-storage unit; and retaining means provided on said main storage unit and said sub-storage unit for retaining removably said sub-storage unit in said positioning space.

2. A storage assembly as defined in claim 1, wherein said sub-storage unit has a rectangular second bottom wall with opposite second longitudinal edges and opposite second lateral edges that extend between said second longitudinal edges, and two second longitudinal walls that extend uprightly and respectively from said second longitudinal edges.

3. A storage assembly as defined in claim 2, wherein said sub-storage unit further has two sub-spacer sets that extend into said storage chamber adjacent to said second longitudinal walls respectively, and that are adapted to position the first record carriers in said storage chamber.

4. A storage assembly as defined in claim 3, wherein each of said sub-spacer sets includes an elongated block that extends from said second bottom wall along the adjacent one of said second longitudinal walls, and a plurality of parallel first spacer plates that extend from one side of said elongated block toward an opposite one of said second longitudinal walls, said first spacer plates being adapted to position the first record carriers between said elongated blocks of said sub-spacer sets in said storage chamber.

5. A storage assembly as defined in claim 4, wherein each of said sub-spacer sets further includes a plurality of parallel second spacer plates that extend upwardly from said elongated block and that are parallel to said first spacer plates, said second spacer plates being adapted to position third record carriers different from the first and second record carriers on top of said elongated blocks of said sub-spacer sets in said storage chamber.

6. A storage assembly as defined in claim 5, wherein said second spacer plates differ in number from said first spacer plates.

7. A storage assembly as defined in claim 2, wherein said retaining means comprises a first coupling unit provided on a top side of said first bottom wall, and a second coupling unit provided on a bottom side of said second bottom wall.

8. A storage assembly as defined in claim 7, wherein said first coupling unit includes at least one resilient projection, and said second coupling unit includes at least one recess for engaging fittingly and removably said first coupling unit.

9. A storage assembly as defined in claim 8, wherein said resilient projection has an upright portion extending from said top side of said first bottom wall, and a transverse portion on a top end of said upright portion.

10. A storage assembly as defined in claim 9, wherein said first coupling unit includes two of said resilient projections, said transverse portions of said resilient projections extending in opposite directions.

11. A storage assembly as defined in claim 8, wherein said resilient projection extends longitudinally in said main storage compartment.

12. A storage assembly as defined in claim 2, wherein said main storage unit further has two first lateral walls that extend uprightly and respectively from said first lateral edges, said sub-storage unit further having two second lateral walls that extend uprightly and respectively from said second lateral edges, said retaining means including a first coupling unit provided on inner sides of said first lateral walls, and a second coupling unit provided on outer sides of said second lateral walls.

13. A storage assembly as defined in claim 12, wherein said first coupling unit includes resilient projections on said inner sides of said lateral walls, and said second coupling unit includes recesses in said outer sides of said second lateral walls for engaging fittingly and removably said first coupling unit.

14. A storage assembly as defined in claim 2, wherein said first longitudinal edges are at least two times longer than said second longitudinal edges.

15. A storage assembly as defined in claim 8, wherein said resilient projection has a rounded cross-section.

16. A storage assembly as defined in claim 8, wherein said resilient projection is a dovetail projection.

* * * * *